United States Patent [19]

Lemke

[11] 4,048,663
[45] Sept. 13, 1977

[54] SOLID STATE OVERLOAD RELAY TRANSFORMER CIRCUIT

[75] Inventor: Winfred R. Lemke, Mequon, Wis.
[73] Assignee: Square D Company, Park Ridge, Ill.
[21] Appl. No.: 654,423
[22] Filed: Feb. 2, 1976
[51] Int. Cl.² .......................... H02H 3/08; H02H 7/08
[52] U.S. Cl. ........................................ 361/75; 361/98; 361/114
[58] Field of Search .............. 317/36 TD, 33 C, 13 R, 317/22, 33 SC

[56] References Cited
U.S. PATENT DOCUMENTS

| | | | |
|---|---|---|---|
| 3,434,011 | 3/1969 | Zocholl | 317/36 TD X |
| 3,851,216 | 11/1974 | Clarke et al. | 317/36 TD X |

*Primary Examiner*—J D Miller
*Assistant Examiner*—Patrick R. Salce
*Attorney, Agent, or Firm*—William H. Schmeling; Richard T. Guttman

[57] ABSTRACT

A self-powered solid state overload relay having current transformers energized by current to a motor to be protected. The transformer has secondary windings connected through diodes to charge a capacitor in a circuit which senses the magnitude of motor current and capacitors in a trip-reset circuit which causes the circuit to be interrupted when the motor current exceeds a pre-programmed value. The diodes in capacitor charging circuits are poled so that the capacitor in the sensing circuit and the capacitor trip-reset circuit are charged by opposite polarity rectified half wave current pulses. The cores of the transformers are sized and impedances are included in the charging circuits to cause the capacitors in the trip-reset circuit to be fully charged before the capacitor in the sensing circuit is charged to a level which would cause the relay to operate to interrupt the motor circuit and the cores of the transformers to saturate in one direction on their associated hysteresis loops when the capacitors in the trip-reset circuit are being charged and in the opposite direction after the capacitor in the sensing circuit is charged.

16 Claims, 4 Drawing Figures

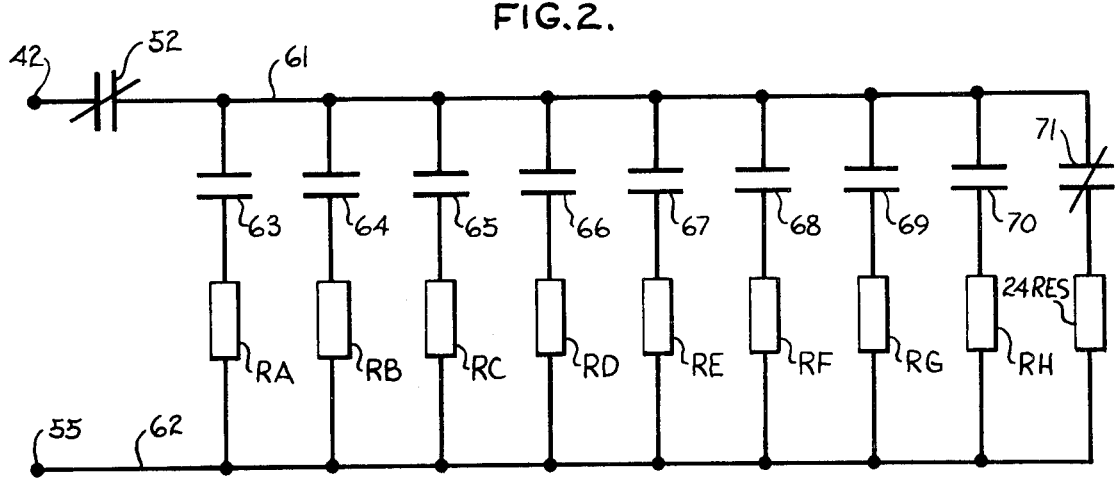
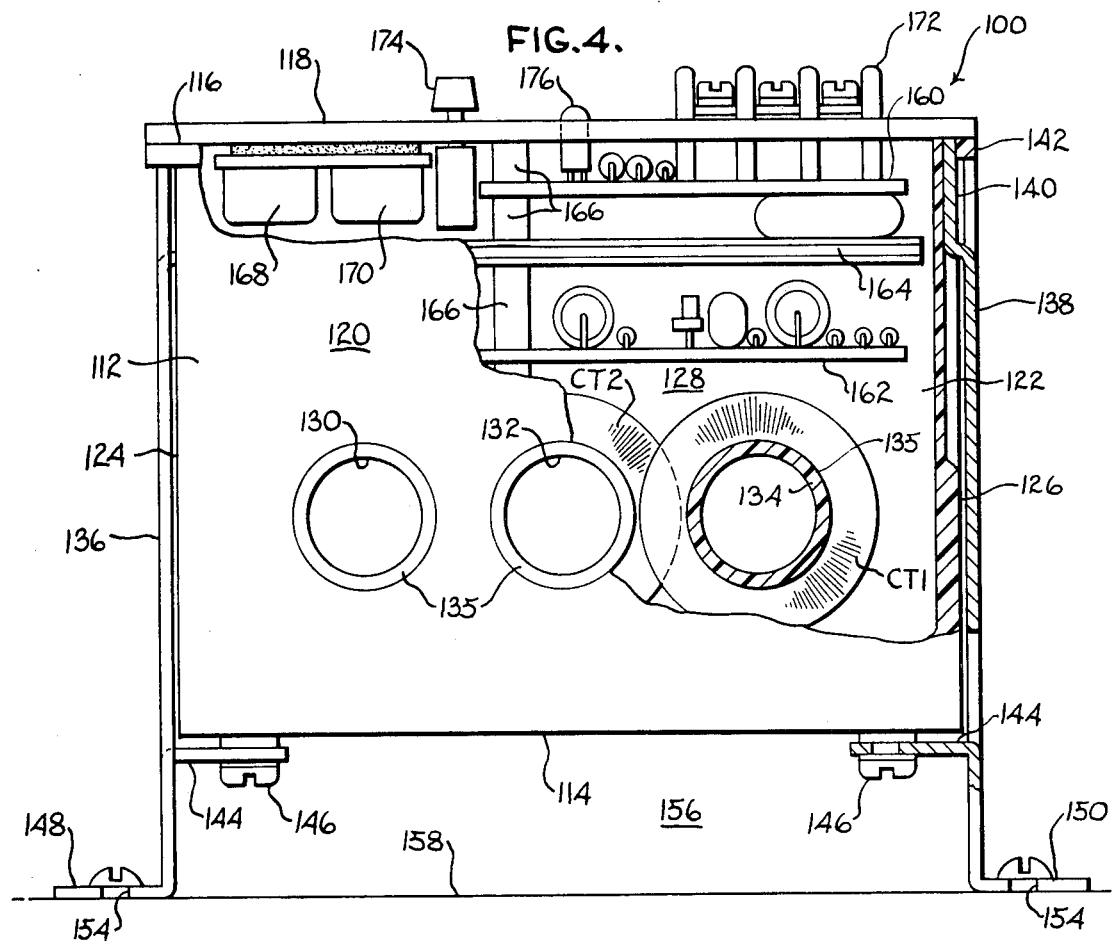

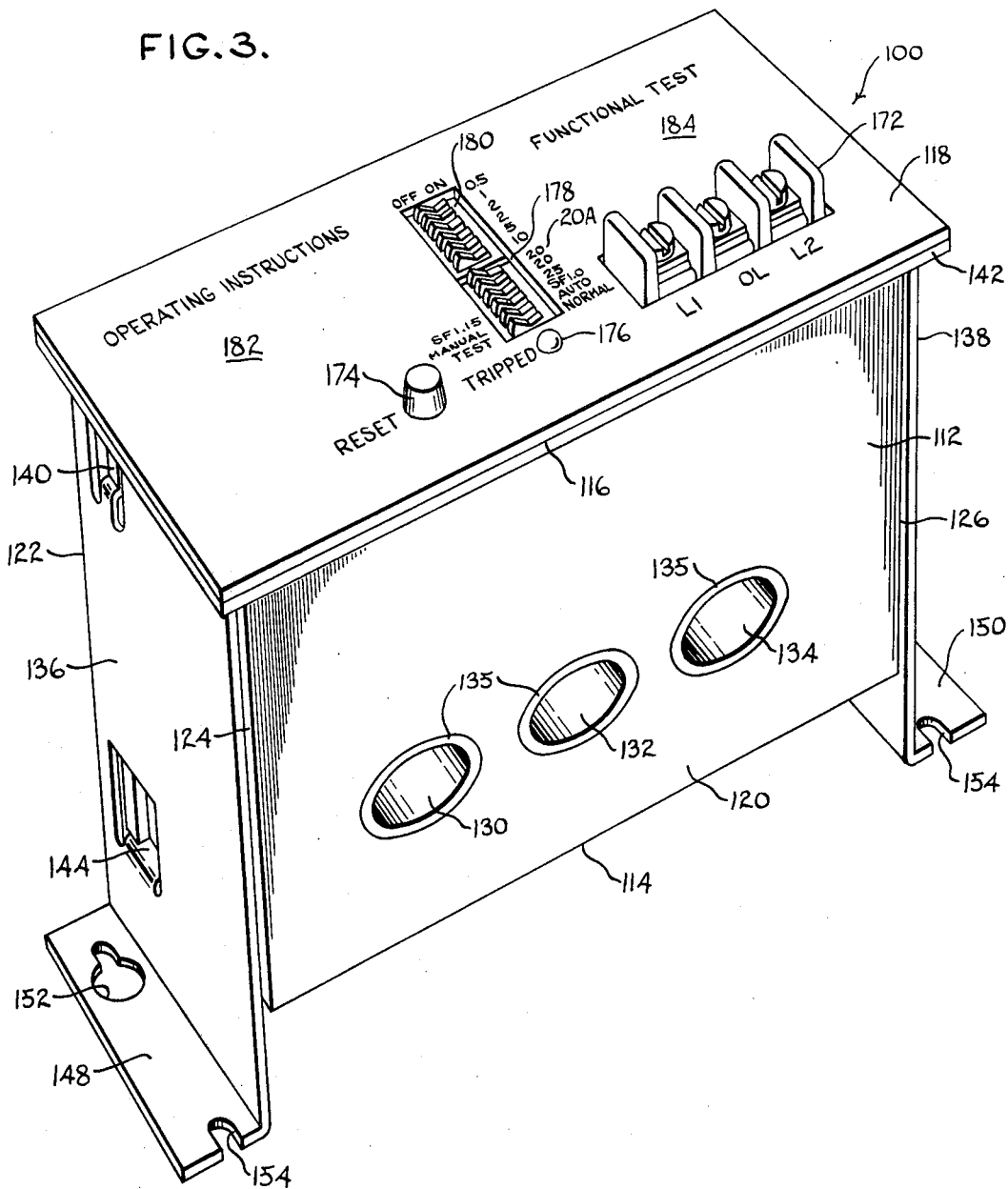

SOLID STATE OVERLOAD RELAY TRANSFORMER CIRCUIT

This invention relates to a protective device for deactuating an electromechanically operated switch in response to abnormal alternating current in a power circuit and is more particularly concerned with the construction of the current sensing transformers and the circuits within the protective device.

Conventional alternating current motor circuits usually include a switching device, known as a contactor, which completes and interrupts the power circuit to the motor and an overload relay which in response to an excess current to the motor, causes the switching device to interrupt the circuit to the motor to protect the motor from damage. Heretofore, devices known as melting alloy or bimetal overload relays have been used for this purpose. More recently, devices known as solid state overload relays have been introduced to protect motors in the more expensive motor installations. These solid state relays usually include a means, such as current transformers, which have magnet cores surrounding portions of the power conductors to the motor so that the conductors serve as primary windings of the transformers and secondary windings inductively wound on the cores. The outputs of the secondary windings are usually connected through diodes to charge a current level sensing circuit and a circuit responsive to an output of the sensing circuit which causes the solid state relay to open the circuit to the coil of the contactor to interrupt the circuit to the motor. Additionally, as many motor applications also require an arrangement which will automatically reset, the solid state circuits are provided with timing capacitors which will cause the relay to automatically reclose the circuit to the contactor coil a timed interval after the relay has tripped.

One method of connecting the output of the secondary windings through the rectifying diodes is to interconnect the outputs of the windings in series through a standard 6 diode three phase rectifying bridge so that the detecting circuit is supplied with full wave pulses rectified direct current. This arrangement is objectionable in that if the overload relay is used with a three phase motor which is energized by current in a single conductor, the output signal of the interconnected secondary windings will provide a signal that has magnitude one half or less than the signal which would occur if current is present in all three phases of the motor. Further, when the current in the three phases of the motor is unbalanced, the output signal of the bridge will be closer to the average value of the three phase current in the three motor windings instead of the winding having the greatest current. This shortcoming cannot be corrected by designing the detecting circuit so it is responsive to the peak outputs of the secondary windings because of the averaging effect due to the interaction between the secondary windings. The circuit according to the present invention overcomes the aforementioned objectionable features of presently used circuits.

In the circuit according to the present invention, the outputs of the current transformers are connected in parallel which prevents the windings from interacting with each other to eliminate the averaging effect of the series connected windings. Further, as the outputs of the transformers secondary windings provide a signal indicative of the current in the winding having the greatest current, the circuit is responsive to unbalanced and single phase operation of the motor. Additionally, the charging circuits for the capacitors within the relay are arranged so that the capacitors in the sensing circuit and the trip-reset circuit are charged by opposite polarity rectified half wave output current pulses of the secondary windings with the impedances and energy requirements of the charging circuit arranged to cause the trip-reset capacitors to be fully charged before the sensing circuit capacitor is charged to a level which will cause the trip-reset circuit to operate to assure a positive operation of the relay. The impedances in the circuits are also arranged to cause the current in the sensing circuit to be greater than the current in the trip-reset circuit after the capacitor in the trip-reset circuit is fully charged, which causes the transformer cores to saturate in one direction when the capacitor in the trip-reset circuit is being charged and to saturate in the opposite direction when the capacitor in the sensing circuit is being charged to a level indicative of the current to the motor.

It is an object of the present invention to provide a solid state overload relay circuit which will cause the cores of current transformers to saturate in opposite directions during intervals when the output of the secondary windings of the transformers is charging capacitors in the circuit so the size of the cores may be minimized to reduce the cost and space requirements of the transformers.

Another object is to provide a solid state overload relay circuit with current transformers which provide an output indicative of the alternating current in an alternating current motor and circuits which will cause a trip-reset circuit in the relay to be conditioned to operate before the circuit which detects the level of current in the motor is conditioned to cause the trip-reset circuit to become operative.

A further object is to provide a solid state overload relay with current transformers which provide an output indicative of the alternating current in an alternating current motor and circuits including capacitors and impedances which will cause the cores of the transformers driven toward saturation in a direction when the circuit is initially energized and in the opposite direction when the circuit is operating to detect the level of current in an alternating current motor so the size and cost of the transformers may be minimized and the power delivered to the detection circuit within the relay is reduced.

An additional object is to provide an economical, simple circuit for detecting the magnitude of peak currents in any phase of a multiphase alternating current load with said circuit including a plurality of current transformers equal in number to the number of phases of the load and each having a secondary winding individually energized by current in an individual conductor connecting one of the phases of the load to one phase of a multiphase source, a pair of impedance circuits at least one of which includes a capacitor connected in parallel with a resistor and a plurality of diodes connected and poled so all of the secondary windings are connected in parallel in a circuit that is connected in series with both impedance circuits to prevent interaction between the transformers when the impedance circuits are energized by the outputs of the transformers.

Further objects and features of the invention will be readily apparent to those skilled in the art from the following specification and from the appended drawings illustrating certain preferred embodiments, in which:

FIG. 2 is a schematic wiring diagram of a switching circuit which is used to program the circuit shown in FIG. 1;

FIG. 3 is a perspective view of the overload relay structure according to the present invention; and, FIG. 4 is a side view of the relay structure in FIG. 1 with portions of the housing broken away to illustrate the positioning of the circuit components and current transformers within the housing.

Figure 1:
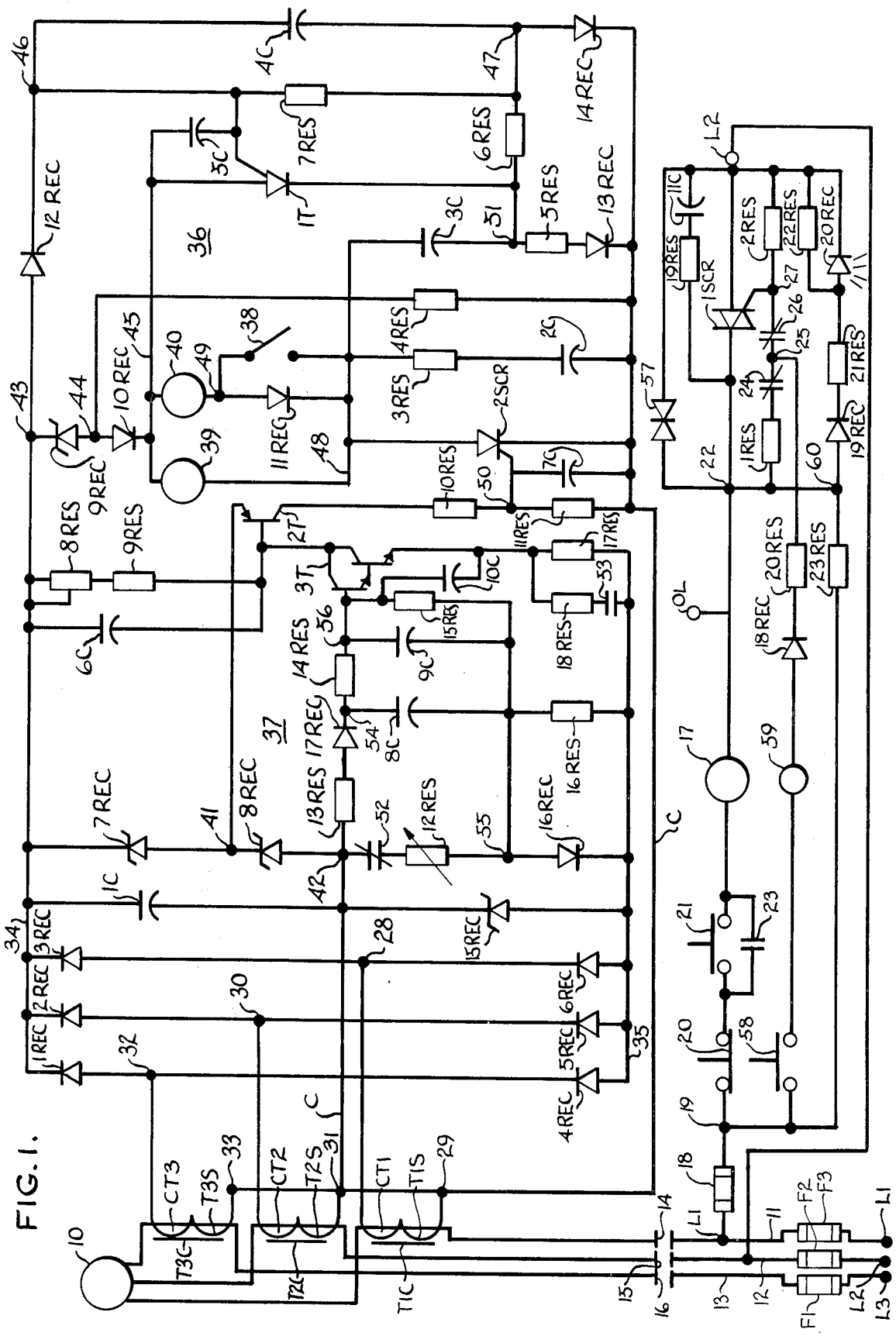
FIG. 1 is a schematic wiring diagram of a solid state relay circuit as may be used with the relay structure according to the present invention.

In the drawings, an alternating current motor 10 has its windings connected through conductors 11, 12 and 13 and closed switching contacts 14, 15 and 16 to the terminals L1, L2 and L3 of an alternating voltage source, not shown. The contacts 14, 15 and 16 are closed when a coil 17 is energized and open when the coil 17 is de-energized. The coil 17 is connected across the terminals L1 and L2 by a series circuit that includes a fuse 18, a junction 19, a stop switch 20 having normally closed contacts, a start switch 21 having normally open contacts, the coil 17, a junction 22, main terminals of a triac 1SCR and a pair of normally open contacts 23 connected in parallel with the open contacts of the switch 21. The contacts 23 are closed when the coil 17 is energized. Connected in parallel between the main terminals of the triac 1SCR is a series circuit that controls the conductive state of the triac 1SCR. This circuit includes a resistor 1RES, a set of normally closed contacts 24, a junction 25, a set of normally closed contacts 26, and a resistor 2RES. The gate of the triac 1SCR is connected to a junction 27 located between the contacts 26 and the resistor 2RES. The contacts 21 or 23 and 24 and 26, when closed, will complete an energizing circuit to the gate of the triac 1SCR which causes the triac 1SCR to conduct and the coil 17 to be energized. The coil 17, when energized, will cause the contacts 14, 15 and 16 and 23 to close and the motor 10 to be energized. The closed contacts 23 will complete a circuit around the normally open start switch contacts 21 so that the motor 10 will remain energized when the switch 21 is opened. The opening of the switch contacts 26 will cause the conduction of the triac 1SCR to be interrupted and the coil 17 to be de-energized. The de-energized coil 17 will cause the contacts 14, 15, 16 and 23 to open and the motor 10, as well as the coil 17, to be de-energized.

A protective circuit which will cause the switching contacts 26 to open in response to overload current conditions in the circuit to the motor 10 includes three identical current transformers CT1, CT2 and CT3. The transformer CT1 has a ring-shaped magnet iron core T1C providing an opening through which the conductor 11 extends. The conductor 11 acts as a primary winding of the transformer CT1 and causes a secondary winding T1S of the transformer CT1, which is toroidally wound on the ring-shaped core T1C, to provide an output current signal having a magnitude and phase dependent upon the magnitude and phase of the current flowing in the conductor 11. Similarly, the transformers CT2 and CT3 have ring-shaped magnet iron cores T2C and T3C with openings extending therethrough. The conductors 12 and 13 extend through the openings of the ring-shaped cores T2C and T3C respectively and act as primary windings which causes the toroidally wound secondary windings T2S and T3S of the transformers CT2 and CT3 respectively to provide output current signals having a magnitude and phase dependent upon the magnitude and phase of the current flow conductors 12 and 13, respectively. The secondary winding T1S has a pair of output terminals 28 and 29. Similarly, the secondary windings T2S and T3S have output terminals 30 and 31 and 32 and 33, respectively.

The terminals 32, 30 and 28 are respectively connected to the anodes of diode rectifiers 1REC, 2REC and 3REC and the cathodes of diode rectifiers 4REC, 5REC and 6REC, respectively. The rectifiers 1REC, 2REC and 3REC have their cathodes connected to a lead 34 and the rectifiers 4REC, 5REC and 6REC have their anodes connected to a lead 35. The terminals 29, 31 and 33 are connected to a common lead C.

The transformer secondary windings T1S, T2S and T3S are arranged to energize a trip-reset circuit 36 and a current level sensing circuit 37, as will now be described. The trip-reset circuit 36 is connected between the lead 34 and the common lead C and includes capacitors 1C, 2C, 3C, 4C and 5C, Zener diodes 7REC, 8REC and 9REC, diodes 10REC, 11REC, 12REC, 13REC and 14REC, resistors 3RES, 4RES, 6RES and 7RES, a thyristor 2SCR, a programmable unijunction transistor 1T, a switch 38 and coils 39 and 40 of a pair of single pole latching reed relays. The Zener diode 7REC has its cathode connected to the lead 34 and its anode connected to a junction 41. The junction 41 is connected to the cathode of the Zener diode 8REC and the emitter of a transistor 2T. The Zener diode 8REC has its anode connected to a junction 42 in the common lead C so that the Zener diodes 7REC and 8REC regulate the potential between the lead 34 and the common lead C. The capacitor 1C is connected between the lead 34 and the common lead C. The base of the transistor 2T is connected through a pair of series connected resistors 8RES and 9RES to the lead 34 with a capacitor 6C connected in parallel with the resistors 8RES and 9RES. The resistor 8RES is a calibrating resistor. The Zener diode 9REC has its cathode connected to a junction 43 in lead 34 and its anode connected to a junction 44 which is connected through the resistor 4RES to the common lead C and through the diode 10REC to a lead 45. The diode 10REC is poled to conduct current from the junction 44 to the lead 45. The diode 12REC has its anode connected to the junction 43 and its cathode connected through a junction 46 to one side of the capacitor 4C which has its other side connected through a junction 47 and the diode 14REC to the common lead C. The diode 14REC is poled to conduct current from the junction 47 to the common lead C. The coil 39 is connected between the lead 45 and a lead 48, which in turn is connected through the thyristor 2SCR to the common lead C. Similarly, the coil 40 is connected between the lead 45 through a junction 49 and the diode 11REC to the lead 48. The coils 39 and 40 are energized whenever the thyristor 2SCR is conductive. The switch 38 is connected in parallel with the diode 11REC between the junction 49 and the lead 48. The collector of the transistor 2T is connected through a resistor 10RES to a junction 50, which in turn is connected through a resistor 11RES to the common lead C and to the gate of the thyristor 2SCR. A capacitor 7C is connected between the gate of the thyristor 2SCR and the common lead C. The capacitor 2C and the resistor 3RES are connected between the lead 48 and the common lead C in parallel with the thyristor 2SCR. The capacitor 3C is connected between the lead 48 and a junction 51, which in turn is connected through the resistor 6RES to the junction 47 and through the series connected resistor 5RES and diode 13REC to the common lead C. The diode 13REC is poled to conduct current from the junction 51 to the common lead C. The programmable unijunction transistor 1T has its anode connected to the lead 45 and its cathode connected to the junction 51. The gate of the transistor 1T is connected to the junction 46 and through the resistor 7RES to the junction 47. The capacitor 5C is connected between the anode and gate of the transistor 2T.

The current level sensing circuit 37 is connected between the lead 35 and the common lead C and includes capacitors 8C, 9C, and 10C, a Zener diode 15REC, diodes 16REC and 17REC, resistors 12RES, 13RES, 14RES, 15RES, 16RES, 17RES and 18RES, a Darlington connected transistor 3T and switches 52 and 53. The Zener diode 15REC has its cathode connected to the junction 42 and an anode connected to the lead 35. The junction 42 is connected to the anode of Zener diode 8REC and through the resistor 13RES and the diode 17REC to a junction 54. The diode 17REC is poled to conduct current from the junction 42 to the junction 54. The junction 42 is also connected through the normally closed contacts of the switch 52 and the adjustable resistor 12RES to a junction 55. The junction 55 is connected to the anode of the diode 16REC which has its cathode connected to the lead 35. The capacitor 8C has one side connected to the junction 54 and its other side connected to the junction 55, which in turn is connected through the resistor 16RES to the lead 35. The resistor 14RES is connected between the junction 54 and a junction 56, which in turn is connected to the base of the Darlington connected transistor 3T and through the capacitor 9C to the junction 55. The resistor 15RES is connected between the base of the transistor 3T and the junction 55 and the capacitor 10C is connected between the base and emitter of the Darlington connected transistor 3T. The collector of the Darlington transistor 3T is connected to the base of the transistor 2T and the emitter of the transistor 3T is connected through the resistor 17RES to the lead 35. A series connected resistor 18RES and the switch 53, which has closeable contacts, is connected in parallel with the resistor 17RES.

The circuit associated with the triac 1SCR also includes a protective circuit, a filter circuit, a reset circuit, and a circuit including a light emitting diode which is illuminated whenever the triac 1SCR is nonconductive and the coil 17 is de-energized. The protective circuit is provided by a surge suppressor 57 which is connected between the main terminals of the triac 1SCR. The filter circuit is provided by series connected resistor 19RES and a capacitor 11C which are connected between the junction 22 and the L2 terminal. The reset circuit includes a switch 58 having normally open contacts, a coil 59, a diode 18REC, and a resistor 20RES that are connected in series between the junction 19 and the junction 25. The diode 18REC is poled to conduct current from the junction 19 to the junction 25. The contacts 24 and 26 are included in separate single pole reed switches which are capable of being magnetically latched in either the contact opening or closing positions. The contacts 26 are latched open in response to a current through coil 39 from the lead 45 to the lead 48 and are latched closed in response to a current through the coil 39 from the lead 48 to the lead 45. The contacts 24 are latched open in response to a current through the coil 40 from the lead 45 to the lead 48 and are latched closed in response to a current in the coil 40 from the lead 48 to the lead 45 when the switch 38 is closed. Also, the contacts 24 are latched closed when the coil 59 is energized by the closure of the switch 58 in response to current flow from the junction 19 to the junction 25. The light indicating circuit is connected between the junction 22 and the terminal L2 and includes a diode 19REC, a resistor 21RES and a light emitting diode 20REC which are connected in series between the junction 22 and the L2 terminal. Connected between the anode and cathode of the light emitting diode 20REC is a resistor 22RES. The light indicating circuit is energized when the triac 1SCR is non-conductive and the switches 21 and 58, as well as the contacts 23, are open. The light indicating circuit is energized by current through a resistor 23RES which is connected between the junction 19 and the anode of the diode 19REC which has its cathode connected through the resistor 21RES to the anode of the diode 20REC.

The circuit is in its reset state when the switch contacts 24 and 26 are closed to complete an energizing circuit to the gate of the triac 1SCR. The energization circuit for the triac 1SCR is connected between the terminals L1 and L2 and includes the following series connected elements: the fuse 18, the junction 19, the stop switch 20, the switch contacts 21 which are closed initially to energize the circuit, the coil 17, the junction 22, the resistor 1RES, the closed contacts 24, the junction 25, the closed contacts 26, the junction 27 and the gate of the triac 1SCR. Current through the gate of the triac 1SCR causes the triac 1SCR to switch to a conductive state and the coil winding 17 to be energized, which in turn causes the contacts 14, 15 and 16, as well as the contacts 23, to close. The contacts 23 provide a holding circuit in parallel with the contacts 21 so the switch 21 may be released after the coil 17 is energized. The closed switch contacts 14, 15 and 16 complete an energizing circuit to the motor 10.

The energizing circuit to the motor 10 causes the transformers CT1–CT3 to be energized and their respective secondary windings T1S–T3S to provide an output current dependent upon the magnitude of the current in the motor through the leads 11–13. The output terminals 32, 30 and 28 of the transformer secondary winding T1S–T3S respectively, are connected through the rectifiers 1REC–3REC respectively to lead 34 so that during the half cycles when the terminals 32, 30 and 28 are positive in polarity relative to the terminals 33, 31 and 29, rectifiers 1REC–3REC will cause the capacitors 1C and 4C to be charged in a direction making the lead 34 positive relative to the common lead C. During the half cycles when the terminals 33, 31 and 29 are positive in polarity relative to the terminals, 32, 30 and 28, the rectifiers 4REC–6REC will conduct and cause the capacitors 8C and 9C to be charged in a direction making the common lead C positive in polarity relative to the lead 35. Thus the self-powered trip-reset circuit 36 will be energized during the half cycles when the terminals 28, 30 and 32 are positive in polarity and the current level sensing circuit 37 will be energized during the half cycles when the terminals 29, 31 and 33 are positive in polarity. In the embodiment shown, the capacitors 1C and 4C have a capacitance of 100 and 200 microfarads, respectively, and the capacitors 8C and 9C have a capacitance of 1 microfarad and 120 microfarads, respectively. The capacitors 1C and 4C are connected directly between the lead 34 and the common lead C with substantially no impedance in their charging circuits. In contrast, the capacitors 8C and 9C have the resistors 13RES and 14RES in their charging circuits. When the circuit to the motor 10 is initially energized, and the capacitors are discharged, the required voltage output of transformers CT1–CT3 to charge the capacitors 8C and 9C in the sensing circuit 37 will be greater than the voltage required to charge the capacitors 1C and 4C in the trip-reset circuit 36, so that the cores T1C–T3C will be driven towards saturation during the half cycles when the capacitors 8C and 9C are being initially charged and will not be saturated when the capacitors 1C and 4C are being initially charged. Thus the current will be delivered to the self-powered trip-reset circuit 36 during complete half cycle outputs of the transformer secondary windings T1S–T3S and during only a portion of the half cycle outputs of the secondary winding T1S–T3S when the capacitors in the current level sensing circuit 37 are being charged. This assures that the capacitors 1C and 4C are fully charged before the capacitors 8C and 9C in the current level detecting circuit 37 are charged to a level which will cause the circuit 37 to become operative. After the capacitors 1C, 4C, 8C and 9C are charged, the voltage required to maintain the capacitors 1C and 4C charged in the self-powered trip-reset circuit 36 is greater than the voltage required to maintain and change the charge across the capacitors 8C and 9C in the circuit 37. This causes the cores T1C–T3C of the transformers CT1–CT3 to be driven toward saturation in one direction during the interval when the circuit 37 is initially energized and driven toward saturation in the opposite direction after the circuit 37 is energized. This arrangement provides the following advantages: 1) As the cores of the transformers CT1–CT3 are substantially saturated in the direction which reduces the output of the transformers CT1–CT3 when the charge on the capacitors 1C and 4C is being maintained, less power is required to be dissipated by the Zener diodes 7REC and 8REC; 2) As the cores of the transformers CT1–CT3 are substantially saturated in a direction which will cause the output of the windings T1S–T3S to be maximum when the capacitors 1C and 4C are initially being charged and substantially saturated in a direction to provide a maximum output to the sensing circuit 37 after the capacitors 1C and 4C are charged, the entire hysteresis loop of the cores T1C–T3C is utilized at a maximum so the size of the cores T1C–T3C may be minimized; 3) As the circuits 36 and 37 are energized during different half cycles, the voltages required to energize the circuits are not additive so the size of the cores T1C–T3C also may be reduced to a minimum. The reduction in size of the cores of the transformers CT1–CT3, in addition to reducing the cost and space requirements of the system, also will reduce the power delivered to the sensing circuit 37 when the motor 10 is subjected to short circuit conditions.

The arrangement which causes the capacitors in the trip-reset circuit 36 and the current level sensing circuit 37 to be charged during opposite polarity half cycle outputs of the secondary winding T1S–T3S provides an additional advantage which will now be detailed. For proper motor protection, it is desirable to interrupt the motor current when current in any of the conductors supplying current to the motor exceeds a level which could damage the motor. This result can be accomplished by providing a separate detecting circuit to detect current flow in each motor supply conductor. When this arrangement is used, each detecting circuit includes a current transformer which is energized by the current in one of the conductors and a full wave bridge which rectifies the output of the secondary winding and provides charging current to a voltage level sensing circuit. Thus a protective circuit of this type for a three phase motor could include three current transformers, three full wave rectifying bridge circuits, e.g., 12 diodes, three voltage sensing circuits, e.g., at least three capacitors, and an OR logic circuit which is controlled by the outputs of the three voltage level sensing circuits to provide an output signal when the current in any of the three conductors exceeds a predetermined level. This arrangement is both expensive and cumbersome.

Another conventional arrangement which may be used employs three current sensing transformers which are energized by current in the three conductors supplying current to the motor. The secondary windings of the transformers are connected through a standard 6 diode three phase full wave rectifying bridge to a single voltage level sensing circuit. When this arrangement is used, regardless of whether the secondary windings are connected in a Y or delta connection to the input terminals of the rectifier, at any one instant electrically at least two secondary windings will be connected in series with each other. The series connection between the secondary windings causes an interaction between the windings of the three current transformers and the circuit to have several objectionable features due to the interaction.

In certain types of motor failures it is possible that current may be present in only one of the three conductors that are connected to a three phase motor. This condition may occur when the wire connection to two of the three phase windings of the motor are broken and the proper end of the remaining winding is connected through a grounded connection to the source supplying the motor. As an example, when this condition exists and the current in the conductor supplying current to the motor increases to twice the normal level, its associated current transformer to provide a corresponding output signal which is double the normal motor full load current signal. However, because of the series connection between the secondary windings, the combined output of the three transformers will cause the capacitor in the voltage level sensing circuit to be charged to a voltage equal to one half the voltage output signal provided by the single transformer that is detecting the motor current so that as far as the detecting circuit is concerned, the current carrying conductor is providing the motor with normal current. Further, when an unbalanced current is flowing in all three conductors to the motor, the interaction between the secondary windings will cause the outputs of the current sensing transformers to be averaged so that the voltage level sensing circuit will be charged to a level indicative of the average current in all three phases of the motor, rather than the current in the phase winding of the motor having the highest current.

In the circuit according to the present invention, as shown in FIG. 1, the output terminals 29, 31 and 33 are connected to the common lead C which acts as a common junction for one of the output terminals of each secondary winding T1S–T3S. The lead C is connected to one side of the capacitors in the trip-reset circuit 36 and the capacitors in the current level sensing circuit 37.

The other terminals 32, 30 and 28 are respectively connected through the diodes 1REC-3REC and the lead 34 to the other side of the capacitors in the trip-reset circuit 36 so that the capacitors in the circuit 36 are each connected in a series circuit between the lead 34 and the common lead C. The diodes 1REC-3REC which are connected and poled between the terminals 32, 30 and 28 and the lead 34 cause capacitors in circuit 36 to be charged by the common polarity direct current pulses that are provided by the rectified alternating polarity output signals from the secondary windings T1S-T3S during intervals when the polarity of the alternating polarity signals causes the terminals 32, 30 and 28 to have a positive polarity relative to the common lead C. Similarly, the terminals 32, 30 and 28 are respectively connected through the diodes 4REC-6REC and the lead 35 to the other side of the capacitors in the current level sensing circuit 37 so that the capacitors in the circuit 37 are each connected in a series circuit between the common lead C and the lead 35. The diodes 4REC-6REC, which are connected and poled between the terminals 32, 30 and 28 and the lead 35, cause the capacitors in the circuit 36 to be charged by the common polarity direct current pulses that are provided by the rectified alternating polarity output signals from the secondary windings T1S-T3S during intervals when the alternating polarity signals causes the terminals 32, 30 and 28 to have a negative polarity relative to the common lead C.

The arrangement which causes the capacitors in the circuit 36 to be charged when the terminals 28, 30 and 32 have a positive polarity and the capacitors in the circuit 37 to be charged when the terminals 28, 30 and 32 have a negative polarity through a circuit that includes the common lead C in addition to the advantages heretofore described, permits the secondary windings T1S-T3S to be connected in a parallel circuit. The parallel connection of the windings T1S-T3S prevents transformers CT1-CT3 from interacting with each other so that the voltage signal between the common lead C and the lead 35 as supplied to the current level sensing circuit 37 will reflect the peak output voltages of the transformers CT1-CT3. Thus, under conditions when single phase current, unbalanced phase current, or excess current is present in a single supply conductor to the motor 10, the output of the transformers CT1-CT3 will be indicative of the actual magnitude of the current in the windings of the motor 10, rather than an average value as provided by similar circuits heretofore known.

The capacitor 3C is also charged during the half cycles when the capacitors 1C and 4C are being charged to a voltage regulated by the Zener diodes 7REC, 8REC, and 9REC. The charging circuit for the capacitor 3C includes the junction 43, the Zener diode 9REC, the junction 44, the diode 10REC, the coil windings 39 and 40, the lead 48, the capacitor 3C, the junction 51, the resistor 5RES and the diode 13REC.

The coil windings 39 and 40 are connected in parallel in the charging circuit for the capacitor 3C and when the switch 38 is closed, the charging circuit will include the switch 38, as well as the diode 11REC. It is to be noted that the charging circuit for the capacitor 3C could also include the resistor 6RES and the diode 14REC. However, the resistor 6RES is selected to have an impedance appreciably greater than the resistor 5RES. In the circuit shown, the impedance of the resistor 6RES is 100K and the impedance of the resistor 5RES is 6.8K. Thus the resistor 5RES limits the charging current through the diode 13REC when the capacitor 3C is charged. The impedance of the resistor 5RES is selected to limit the current flow through the coils 39 and 40 to a value which will not cause the contacts 26 and 24 to open.

When the motor 10 is initially energized from a cold start, as caused by the initial closing of the contacts 14, 15 and 16, the starting current to the motor 10 will be considerably higher than the normal running and overload currents to the motor. During this interval the charge on the capacitors will increase, as previously indicated, so that the circuit will not respond to the normal starting motor currents. After the capacitors in the circuit are charged, the current to the motor 10 will cause the transformers CT1-CT3 to provide an output which varies with the current to the motor 10 and a potential to appear between the junction 42 and the lead 35 which is dependent upon the adjusted impedance of the resistor 12RES. The potential between the junction 42 and the junction 55 causes the capacitors 8C and 9C to be charged through the resistors 13RES, diode 17REC, and the resistor 14RES. The resistor 13RES has a relatively low impedance, i.e., 220 ohms, and the capacitor 8C has a relatively low capacitance. Therefore the capacitor 8C is charged to substantially the peak voltages across the resistor 12RES. The 220 ohm impedance of resistor 13RES causes the capacitor 8C to be charged to a potential that is substantially equal to the peak voltages of the outputs of the secondary windings T1S-T3S that appears across the resistor 12RES. The capacitor 9C is connected between the base and the emitter of the Darlington connected transistor 3T through a circuit that includes the resistors 17RES and 16RES. The conduction of the transistor 3T increases as the charge across the capacitor 9C is increased. The transistor 2T has its emitter connected to the regulated potential at the junction 41 and its base connected to the collector of the transistor 3T. The collector of transistor 3T is also connected through the resistors 8RES and 9RES to the lead 34. The capacitor 6C is connected in parallel with the resistors 8RES and 9RES. The base of the transistor 2T and the collector of the transistor 3T are connected in a voltage dividing circuit that includes the adjustable resistor 8RES and the resistor 9RES in the collector circuit of the transistor 3T and the resistor 17RES in the emitter circuit of the transistor 3T. The collector voltage of 3T and the voltage across the resistors 8RES and 9RES may be thus varied when the transistor 3T is conducting in its active range by adjusting the resistor 8RES. The resistor 8RES is included in the circuit to provide a factory calibration adjustment.

The adjustable resistor 12RES is included in the base to emitter circuit of the transistor 3T and, as will be later described, may be adjusted with precision to vary the voltage across the capacitor 9C and the conduction of the transistor 3T in response to the outputs of the transformers CT1-CT3 and over a wide range of motor 10 currents. The resistor 17RES is connected in the emitter circuit of the transistor 3T. The resistor 18RES is connected in series with the switch 53 so as to be in parallel with the resistor 17RES when the switch 53 is closed. The closed switch 53 will cause an increase in the collector current of the transistor 3T in response to the charge on the capacitor 9C.

The resistors 12RES and 8RES are adjusted to maintain the conduction of the transistor 3T at a level which will cause the base of the transistor 2T to be positive relative to the emitter of the transistor 2T, as regulated by the Zener diode 8REC, so the transistor 2T is non-conducting during normal motor 10 currents. An increase in current in the motor 10, above the preadjusted normal value, will be reflected in an increase in the potential across the capacitor 9C and an increase in the conduction of the transistor 3T which causes the conduction of the transistor 2T to increase the gate to cathode current to the thyristor 2SCR to a value which causes the thyristor 2SCR to switch into its conductive state. The conducting thyristor 2SCR causes the coils 39 and 40 to be energized by current from the junction 43 to the common lead C through the circuit that includes the diode 9REC, the junction 44, the diode 10REC and the lead 45. The coils 39 and 40 are connected in parallel between the lead 45 and the lead 48 with the circuit through the coil 40 including the diode 11REC. The energized coils 39 and 40 will cause their associated contacts 26 and 24 to open and remain in latched open condition. The open contacts 26 cause the circuit to the gate of the triac 1SCR to be interupted and the triac 1SCR to switch to a non-conductive state. The non-conducting triac 1SCR causes the coil 17 to be de-energized and the contacts 14, 15 and 16 as well as the contacts 23 to open to thereby de-energize the circuit to the motor 10 and interrupt the holding circuit to the coil 17 through the contacts 23. The output of the transformers CT1-CT3 ceases upon the interruption of current to the motor 10 which causes the capacitor 4C to discharge at a timed rate through the resistor 7RES. The capacitor 3C is connected between the anode and cathode of the programmable unijunction transistor 1T through a circuit that includes the coil 39 and the coil 40 when the switch 38 is closed. The capacitor 4C is connected between the gate and cathode of the programmable unijunction transistor 1T through a circuit that includes the resistor 6RES. Thus when the charge across the capacitor 4C decays to a value which causes potential across the capacitor 4C to be slightly less than the potential across the capacitor 3C, the programmable unijunction transistor 1T conducts. The conducting transistor 1T causes the charge across the capacitor 3C to be delivered through the coil windings 39 and 40, when the switch 38 is closed, through a circuit that includes the lead 48, the closed switch 38, the coil windings 39 and 40, the lead 45, the conducting transistor 1T and the junction 51. The current through the coils 39 and 40, as supplied by the capacitor 3C, is in the opposite direction of the current which flows when the thyristor 2SCR is conducting so that the coils 39 and 40 cause the contacts 26 and 24 to close and thereby reset the circuit. The circuit shown is programmed so that the circuit will automatically reset when the switch 38 is closed and is programmed to be manually reset when the switch 38 is open. When the switch 38 is open, the diode 11REC will prevent the charge on the capacitor 3C from being delivered through the coil 40 so that the coil 40 is not energized when the coil 39 is energized and the contacts 24 remain open after the charge on the timing capacitor 4C decays to a value which will permit the transistor 1T to conduct, as previously described. Thus the motor 10 will not be automatically energized when the start switch 21 is closed as the open contacts 24 will interrupt the circuit to the gate of the triac 1SCR from the junction 22. After the contacts 26 are closed in response to the conduction of transistor 1T as described, the circuit may be manually reset by closing the switch 58 to complete a circuit from the junction 19 to the gate of the triac 1SCR. The manual reset circuit includes a switch 58, a second coil 59 of the reed relay associated with the contacts 24, the diode 18REC, the resistor 20RES, the junction 25, the previously closed switch contact 26, the junction 27, and the resistor 2RES. The energized coil 59 causes the contacts 24 to close which resets the circuit so that a subsequent closure of the start switch 21 will cause the coil 17 to be energized, as previously described. It is to be noted that the closure of the reset switch 58 during intervals when the contacts 26 are open will prevent the energization of the coil 59 to duplicate the trip-free functions of melting alloy and bi-metallic overload relays.

The circuit also includes the light emitting diode 20REC which is energized and illuminated when the triac 1SCR is non-conducting to visually indicate that the circuit is in its tripped condition. The diode 20REC will be de-energized and non-illuminated when the triac 1SCR is conducting and the circuit is in its reset state. The diode 20REC is connected between the junction 19 and the L2 terminal by a series circuit that includes the junction 19, the resistor 23RES, a junction 60, the diode 19REC, the resistor 21RES and the diode 20REC with the resistor 22RES connected in parallel with the diode 20REC. The junction 60 is connected to the junction 22. Thus the conducting triac 1SCR will present a low impedance path in parallel with the circuit that includes the diode 19REC, the resistor 21RES and the diode 20REC and prevent the diode 20REC from being illuminated. The low impedance circuit in parallel with the diode 20REC circuit disappears when the triac 1SCR is non-conducting which causes the diode 20REC to be energized through its series circuit, as described, to visually indicate the non-conducting state of the triac 1SCR.

The conduction of the thyristor 2SCR causes the capacitor 1C to discharge concurrently with the capacitors 2C and 6C and provide energy which causes the coils 39 and 40 to be energized and the contacts 24 and 26 to open through a circuit that includes the lead 34, the junction 43, the diode 9REC, the diode 10REC, the coils 39 and 40, the diode 11REC, the conducting thyristor 2SCR, the common lead C, and the junction 31. The discharge of the capacitor 1C causes the collector voltage of the transistor 3T to disappear so that the transistor 3T acts as a diode and provides a timed discharge path for the discharge of the capacitor 9C through the circuit that includes the transistor 3T base to emitter, the resistor 17RES and the resistor 16RES. The impedance of resistors 17RES and 16RES is selected so that the rate of discharge of the capacitor 9C will duplicate the cooling rate of bimetal and solder type overload relays. Thus, if an attempt is made to restart the motor 10 shortly after the circuit has responded to an excess motor current, the capacitor 9C will not be completely discharged and the circuit will respond more quickly to an excess motor current then when the motor 10 is cold and initially subjected to an overload motor current.

The following components which are included in their associated circuits provide the following functions. The diode 13REC prevents the discharge of the capacitor 3C through the thyristor 2SCR. The diode 10REC prevents the discharge of the capacitor 3C through the circuit that includes the coil 39, the diode 10REC, the diode 9REC and the resistors 7RES and 6RES. The diode 12REC prevents the discharge of the capacitor 4C. The diode 14REC prevents the discharge of the capacitor 3C through the thyristor 2SCR and the resistor 6RES. The capacitor 2C and the resistor 3RES, the capacitor 7C and the resistor 11RES, the capacitor 11C and the resistor 19RES, as well as the capacitors 5C and 10C act as filters in the circuit. The resistor 10RES limits the gate current in the thyristor 2SCR. The diode 9REC limits the voltage applied to the coils 39 and 40 as well as establishes the proper charge level on the capacitor 3C to prevent reversal of the polarity of the permanent magnets within the reed relay switches associated with the contacts 26 and 24 respectively, which would occur if an excess voltage was applied to the coils 39 and 40. The resistor 4RES is provided to maintain the diode 9REC in a regulating mode to prevent the capacitor 3C from being charged by leakage current which would otherwise flow through the diode 9REC if the resistor 4RES was not included in the circuit. The diodes 16REC and 17REC are connected to compensate each other for variations in temperature and to block the discharge current from the capacitors 8C and 9C through their associated circuits. The diode 7REC is selected to have a positive temperature co-efficient characteristic to compensate for the negative temperature co-efficient characteristics of the transistors 2T and 3T. The diode 7REC operates to increase the voltage between base and the emitter of the transistor 2T with an increase in temperature. The diode 15REC is provided to limit the energy to circuit that includes the transistor 3T and to absorb transients which may appear in the circuit. The diode 15REC also limits the energy which is supplied to the circuit so the circuit will have a slower response to excess motor currents than conventional thermally actuated overload relays, i.e., eight to ten times full load current to the motor 10. By limiting the energy supplied to the circuit, the diode 15REC also protects the contactor which includes the contacts 14, 15 and 16, as well as the coil 17, from damage when the circuit to the motor 10 is subjected to short circuit conditions which require the contactor to interrupt current exceeding the interrupting capability of the contactor. During such conditions, the diode 15REC conducts the momentarily increased outputs of the transformers CT1-CT3 and thus limits the rate at which the capacitor 9C is charged to delay the response time of the circuit and the opening of the contacts 14-16. During the delayed interval, the magnitude of the short circuit current will cause the fuses F1, F2 and F3 to burn out and interrupt the circuit before the contacts 14-16 open. The fuses F1-F3 are connected in the circuit between the terminals L1-L3 and the contacts 14-16 of the contactor and when properly sized and coordinated, as well known to those skilled in the art, will interrupt the circuit under normal short circuit conditions before the contactor operates to interrupt the circuit.

The circuit also includes a switch 52 which may be used to test the operation of the entire circuit to simulate the operation of the circuit when the motor 10 is subjected to locked rotor conditions. During normal operation, the switch 52 is closed so that the potential across the capacitor 9C is controlled by the impedance of the adjustable resistor 12RES. When the switch 52 is opened to simulate the locked rotor operating state of the motor 10, the emitter to base of the transistor 3T is connected to the full potential across the rectifier 15REC and the transistor 3T switches into full conduction, which in turn causes the transistor 2T to conduct. The conducting transistor 2T causes the thyristor 2SCR to conduct and the coils 39 and 40 to be energized in the manner previously described. The energized coils 39 and 40 cause the contacts 26 and 24 to open which prevents the triac 1SCR from conducting and causes the light illuminating diode 20REC to be energized to indicate that the circuit is in the tripped condition. After a selected time interval has elapsed, the programmable unijunction transistor 1T conducts, as previously set forth, to energize the coils 39 and 40 in a direction which causes the contacts 26 and 24 to close to place the circuit in a reset condition. The closed contacts 26 and 24 complete a low impedance circuit in parallel with the circuit that includes the diode 20REC and the resistor 21RES so that the diode 20REC ceases to be illuminated. Thus the opening of the switch 52 causes each of the elements including the transistors 2T and 3T, as well as the thyristor 2SCR and the programmable unijunction transistor 1T, to be switched to their conductive states and the triac 1SCR to switch to a non-conductive state to thereby check the operability of all of the components within the circuit.

Motors are commonly manufactured to have service factor ratings of 1.0 and 1.15 with the motor having the service factor rating of 1.15 having the capability of operating with a higher full load motor current that the motor having a service factor rating of 1.0. The switch 53 is included in the circuit to program the circuit so it will operate with either of the two types of motors. When the switch 53 is closed, the circuit is programmed to operate with a motor having a service factor of 1.0 and when the switch 53 is opened, the circuit will operate and protect a motor having a service factor rating of 1.15. The switch 53 is connected in series with the resistor 18RES. The resistor 18RES and the switch 53 are connected in parallel with the resistor 17RES in the emitter circuit of the transistor 3T. When the switch 53 is closed, the total impedance in the emitter circuit of the transistor 3T will be less than the impedance in the emitter circuit of the transistor 3T when the switch 53 is open. The switch 53, when closed, will cause the transistor 3T to switch to a conductive state in response to a lower charge across the capacitor 9C than when the switch 53 is opened. Thus the circuit will respond to lower motor currents when the switch 53 is closed.

In the event the motor 10 is subjected to single phase or operated under load conditions where only one or two of its three phase windings is energized, the current through the energized conductor or conductors 11, 12 or 13 may increase to an abnormal value. The higher-than-normal current in the conductors 11-13 will cause the voltage output of the associated energized secondary windings CT1-CT3 to increase the charge across the capacitor 9C to a level which will cause the coil 17 to be de-energized and the circuit to the motor 10 to be interrupted in the same manner as when the motor 10 was subjected to normal overload conditions, as previously described.

FIG. 2 illustrates a switching arrangement which in the preferred embodiment of the present invention replaces the adjustable resistor 12RES and the switch 52 and is connected between the junctions 42 and 55 to provide a convenient, precise method of adjusting the impedance between the junctions 42 and 55 which are similarly designated in FIG. 2 and connected to a pair of parallel leads 61 and 62, respectively. Connected in parallel between the leads 61 and 62 is a plurality of series circuits each including a switch and a precision resistor having a preselected impedance. Also connected between the leads 61 and 62 is a precision resistor 24RES having a preselected impedance of 95.3 ohms which will cause the circuit to be used with a motor having a rated current of 20 amperes. The resistors in the individual series circuits are designated as RA, RB, RC, RD, RE, RF, RG and RH, and are connected in series with the switches 63–70, respectively. The resistors RA–RH respectively have impedance of 3570, 1780, 909, 357, 178, 90.9 and 71.5 ohms which, when included in the circuit between the leads 61 and 62, because of the closure of their associated switches 63–70, will program the impedance between the leads 61 and 62 so the circuit will respond to incremental motor currents of 0.5, 1, 2, 2, 5, 10, 20 and 25 amperes. Thus, because of the selection of the impedances of the resistors RA–RH, the circuit shown in FIG. 1 can be programmed to respond to a minimum current of 20.0 amperes and a maximum current of 85.5 amperes and any selected increment of 0.5 ampere value between the minimum and maximum values when the primary windings of transformers CT1–CT3 are single turn primaries as provided by the leads 11, 12 and 13, respectively. As will hereinafter be described, the leads 11, 12 and 13 are individually passed through openings or windows in the housing for the overload relay to which the present invention relates. The circuit shown in FIG. 1 may be programmed to respond to motor currents less than 20 ampere by looping all of the leads 10, 11 and 12 through their associated windows an equal number of additional turns with each loop set causing the circuit to respond to lower values of motor current, as well known to those familiar with current transformers. Thus, if the conductors 11, 12 and 13 are looped once through their associated windows to provide two conductors passing through each window, the circuit will be programmed to respond to a minimum of 10 ampere instead of the 20 minimum ampere response which occurs when the conductors 11, 12 and 13 are merely passed through their associated windows.

FIGS. 3 and 4 illustrate a preferred manner in which most of the components shown in FIG. 1 may be packaged to provide a structure that includes solid state components which may be used in motor control circuits in industrial environments. The solid state relay structure 100, shown in FIG. 3, includes a housing 112 formed as a rectangular molded insulating part to have a rear wall 114, a front end 116 closed by a cover 118, a pair of parallel spaced side walls 120 and 122 and a pair of end walls 124 and 126 extending between the rear wall 114 and the front end 116. The housing 112 has a hollow closed interior 128 wherein substantially all of the circuit components shown in FIGS. 1 and 2 are encapsulated after the cover 118 is secured to the front end 116. The conductors 11, 12 and 13, the contacts 14, 15 and 16, the coil 17, the fuse 18 and the switches 20, 21 and the contacts 23, shown in FIG. 1, are not included within the interior 128 of the housing 112. The housing 112 has three spaced bores or windows, 130, 132 and 134 extending between the side walls 120 and 122.

The bores 130, 132 and 134 preferably are provided by tubes 135 extending between openings in the walls 120 and 122 and passing through annular openings in the ring-like cores of the transformers CT1–CT3, previously described. The tubes providing the bores 130–134 serve to position the cores and the secondary windings of transformers within the interior 128 of the housing 112 before the encapsulating material is introduced on the housing 112.

The housing 112 is mounted between a pair of L-shaped supports 136 and 138 which are respectively positioned and extend adjacent the end walls 124 and 126. Each of the supports 136 and 138 has a forwardly projecting projection 140 received in a rearwardly facing opening formed in an outwardly projecting border-like flange 142 extending from the front end 116 at the rear side of the cover 118 and an apertured projection 144 which is secured to the rear wall 114 by a screw 146 which is threaded into suitable threaded inserts embedded in the rear wall 114. The supports 136 and 138 have outwardly turned flanges 148 and 150 located at their respective rear ends which are spaced rearwardly of the rear wall 114. The flanges 148 and 150 are provided with openings 152 and notches 154 which are utilized to mount the relay 100 on a support, designated as 158. When the relay 100 is mounted on a support 158, the rear wall 114 will be spaced from the support 158.

The bores 130, 132 and 134 extend through the housing 112 so that the conductors 11, 12 and 13 may be passed through the bores and act as primary windings of the transformers CT1–CT3. As was previously described, when the conductors 11, 12 and 13 are passed through the bores 130, 132 and 134 so that each bore has a single conductor passing therethrough, the circuits within the relay 100 will respond to a motor current range of 20 to 85.5 amperes. When it is required to have the relay 100 respond to motor currents of less than 20 amperes, the conductors 11, 12 and 13 are looped so that each bore will have more than one conductor extending therethrough and cause the transformers CT1–CT3 to have more than one turn primary winding with each loop of the conductors providing the transformers CT1–CT3 with an additional primary turn. The space 156 between the rear wall 114 and the support 158, when the flanges 148 and 150 are secured to the support 158, as illustrated in FIG. 4, provides a convenient area to receive portions of the conductors 11, 12 and 13 extending external of the bores 130, 132 and 134 when the conductors are looped to provide the primary windings of the transformers CT1–CT3 with multiple turns, as described.

Positioned at the rear side of the cover 118 within the hollow interior of the housing 112 is a stack consisting of a pair of spaced printed circuit boards 160 and 162 with a metal magnetic shield 164 spaced between the boards 160 and 162 by spacers 166. The board 160 is positioned at the rear side of the cover 118 and positions the relays 168 and 170 associated with the coils 39 and 40, respectively, so the relays are shielded by the shield 164 from the magnetic fields generated by the current transformers CT1, CT2 and CT3. The components in the circuit described in FIG. 1 may be positioned on the boards 160 and 162 in any convenient location with the exception of the components which will be hereinafter described which are positioned on the board 160 for the purposes to be hereinafter described.

In addition to the relays 168 and 170, a three section terminal block 172 is secured to the front side of the board 160 to extend through an opening in the cover 118. The terminal block 172 has three terminal screws and wire clamping members designated by circles L1, O1, and L2, which are respectively connected to the points similarly labelled in the circuit shown in FIG. 1 to provide a convenient arrangement for connecting the overload relay 100 to its associated external power and control circuits. A pushbutton switch labelled reset, corresponding to the switch 58 in FIG. 1, has its contact portion located at the rear of the cover 118 and its operating stem extending through an opening in the cover 118 to provide an operating button 174 at the front side of the cover 118 which, when depressed, will close the switch 58 to reset the circuit as previously described. Also extending through an opening in the cover 118 and positioned by the board 160 is the light emitting portion 176 of the light emitting diode 20REC which when illuminated will visually indicate externally of the relay 100 that the relay is in a tripped state. Extending through an opening 178 to the cover 118 are operators for the switches 63–70 in FIG. 2 and operators for the switches 53, 38 and 52, shown in FIG. 1. The switches 63–70, 53, 38 and 52 are packaged in a commercially available miniaturized switch package 180 which is positioned on the printed circuit board 160 so the switch operators are readily accessible from the front of the cover 118. A typical switching package 180 which may be used is known as AMP Dual-In-Line Switch, currently sold by AMP Incorporated, of Harrisburg, Pennsylvania. The AMP Dual-in-Line Switch package is a multiplicity of manually operated, rocker actuated single pole single throw switches packaged for use in mounting hole patterns identical with Integrated Circuit DIP's. The operators for the switches 63–70 are labelled 0.5, 1, 2, 2, 5, 10, 20, 20 and 25, respectively, in FIG. 3, with one of the switches 20 also designated as 20A and corresponding to a switch 71 in FIG. 2 permanently maintained in a closed position. The switch 53, which programs the motor service factor function in FIG. 1, is shown as SF1.15 on the left side of the opening 178 and SF1.0 on the right side of the opening 178 in FIG. 3. Similarly, the switch 38 which programs the circuit in FIG. 1 to provide the manual or automatic reset function is respectively shown as manual and auto on the left and right sides of the opening 178. The switch 52, which provides the test function in the circuit in FIG. 1, is respectively shown as test and normal on the left and right sides of the opening 178. The cover also carries instructions for programming the switches and for testing the operation of the relay 100.

The operating instructions 182, located on the left side of the opening, preferably as follows:

"1. Set switches on ON whose values total motor full-load current rating. Include this 20A switch, which is permanently ON.
2. Select motor service factor (S.F.)
3. Select MANUAL or AUTO reset. WARNING: Do not use auto reset if starter is controlled by a maintained-contact device and unexpected restarting of motor could be hazardous."

The functional test 184 instructions located at the right side of the opening 178 preferably are as follows:

"1. De-energize load.
2. Set MANUAL-AUTO switch to Manual.
3. Set TEST-NORMAL switch to TEST.
4. Energize load. TRIPPED Indicator should light within 15 seconds.
5. Return switches to original position.
6. If reset is MANUAL, wait 3 minutes, then press RESET."

Thus when the switches are properly positioned, the relay 100 may be easily programmed to operate in the desired manner to protect motors having a wide range of motor currents and be easily tested, and reset as well as indicate the operating state of the relay 100.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. A device for protecting an alternating current motor from abnormal motor currents, comprising: a current transformer having a magnet iron core in inductive relation with a portion of a conductor connecting the motor to an alternating current source and a secondary winding inductively coupled through the core to the portion of the conductor to provide an alternating polarity output in response to the alternating current in the conductor, a first circuit including a capacitor connected in a charging circuit to output terminals of the secondary winding, a second circuit including a capacitor connected in a charging circuit with the output terminals of the secondary winding, diodes in the first and the second circuits poled so the capacitors in the first and the second circuits are charged by opposite polarity rectified half-wave current pulses from the secondary winding and impedances in the first and second circuits arranged so the capacitor in the second circuit is fully changed before the capacitor in the first circuit is charged to a preadjusted level and the current in the second circuit is greater than the current in the first circuit when the capacitor in the second circuit is being charged and less than the current flow in the first circuit after the capacitor in the second circuit is fully changed whereby the core of the transformer saturates in one direction on its hysteresis loop when the capacitor in the second circuit is being charged and in the opposite direction when the capacitor in the second circuit is fully charged.

2. A circuit for detecting the magnitude of current in a multiphase alternating current load that is connected to a multiphase alternating current source by a plurality of conductors comprising: a plurality of current transformers with each of said transformers having a secondary winding individually energized by current in an individual conductor to provide an alternating polarity output signal having a magnitude indicative of the magnitude of the current in one of the phases of the load across a pair of output terminals with a first of said pair of output terminals of all of the secondary windings connected to a common junction, a first circuit including a impedance connected in a series circuit between the common junction and a second of said pair of output terminals, a second circuit including an impedance connected in a series circuit between the common junction and the second terminal, diodes on the first circuit connected so the second terminal of each secondary winding is connected through a diode to energize the first circuit with rectified common polarity current pulses that are provided by the alternating polarity output signals during intervals when the polarity of the signals causes the second terminals to have one polarity, and diodes in the second circuit connected so the second terminal of each secondary winding is connected through a diode to energize the second circuit with rectified common polarity current pulses that are provided by the alternating polarity output signals during intervals when the polarity of the signals causes the second terminal to have a polarity opposite the said one polarity.

3. The circuit as recited in claim 2 wherein the impedance in the second circuit is provided by a resistor and the second circuit includes a capacitor connected in series with the resistor.

4. The circuit as recited in claim 3 wherein the impedances of the first and the second circuits are unequal and the capacitance in the first and the second circuits are unequal.

5. A device for protecting an alternating current motor from abnormal motor currents comprising: at least one current transformer having a magnet iron core surrounding at least a portion of a conductor connecting the motor to an alternating current source and a secondary winding wound on the core to provide an alternating polarity output in response to the alternating current in the conductor, a current level sensing circuit including a first capacitor and a switching device having an input connected to the first capacitor for providing an output when the charge across the first capacitor exceeds a preadjusted level, a resettable trip circuit including a bistable element connected to be switched to a tripped state in response to a sensing circuit output, means for causing the motor circuit to be interrupted when the element is in its tripped state, and means including a second capacitor for providing energy for causing the element to switch to its reset state a predetermined time interval after the element is switched to its tripped state and circuit means connected to the secondary winding providing a charging circuit for the first capacitor and a charging circuit for the second capacitor, said charging circuits including diodes poled in their associated charging circuit so the first capacitor and the second capacitor are charged by opposite polarity rectified half wave output current pulses of the secondary winding and an impedance in the charging circuit for the first capacitor for causing the second capacitor to be fully charged before the charge on the first capacitor reaches the preadjusted level.

6. The device as recited in claim 5 wherein the trip circuit includes a third capacitor connected in a discharge circuit for determining the predetermined time interval and in a charging circuit that causes the second capacitor and the third capacitor to be charged by the same half wave pulses during the same time interval.

7. The device as recited in claim 6 wherein the core of the transformer is constructed and the capacitors and their associated charging circuits are arranged so the core of the transformer saturates in one direction on its hysteresis loop when the second and third capacitors are being charged and in the opposite direction when the first capacitor is charged.

8. The device as recited in claim 5 wherein the resettable trip circuit includes a second bistable element that is switched to a tripped state in response to a sensing circuit output for causing the means to interrupt the circuit to the motor and programmable means for causing the capacitor energy to switch the second bistable element to its reset state when the means is programmed so the device operates in an automatic reset mode and prevent the capacitor energy from resetting the second bistable element when the device is programmed to operate in the manual reset mode.

9. A device for protecting a three phase alternating current motor from abnormal motor currents comprising: three current transformers each having a magnet iron core surrounding at least a portion of a conductor connecting the motor to a three phase alternating current source and a secondary winding wound on the core to provide an alternating polarity output in response to the alternating current in its associated conductor, a current level sensing circuit including a first capacitor and a switching device having an input connected to the capacitor for providing an output when the charge across the first capacitor exceeds a preadjusted level, a resettable trip circuit including a bistable element connected to be switched to a tripped state in response to a sensing circuit output, means for causing the motor circuit to be interrupted when the element is in its tripped state, and means including a second capacitor for providing energy for causing the element to switch to its reset state a predetermined time interval after the element is switched to its tripped state and circuit means connected to the secondary windings providing a charging circuit for the first capacitor and a charging circuit for the second capacitor, said charging circuits including diodes poled in their associated charging circuit so the first capacitor and the second capacitor are charged by opposite polarity half wave output current pulses of the secondary windings and an impedance in the charging circuit for the first capacitor for causing the second capacitor to be fully charged before the charge on the first capacitor reaches the preadjusted level.

10. The device as recited in claim 9 wherein the trip circuit includes a third capacitor connected in a discharge circuit for determining the predetermined time interval and in a charging circuit that causes the second capacitor and the third capacitor to be charged by the same half wave pulses during the same time interval.

11. The device as recited in claim 10 wherein the cores of the transformers are constructed and the capacitors and their associated charging circuits are arranged so the cores of the transformers saturate in one direction on their hysteresis loops when the second and the third capacitors are being charged and in the opposite direction when the first capacitor is charged.

12. The device recited in claim 9 wherein the secondary windings are connected in parallel in the charging circuit for the capacitors.

13. The device as recited in claim 12 wherein the trip circuit includes a third capacitor connected in a discharge circuit for determining the predetermined time interval and in a charging circuit that causes the second capacitor and the third capacitor to be charged by the same half wave pulses during the same time interval.

14. The device as recited in claim 13 wherein the cores of the transformers are constructed and the capacitors and their associated charging circuits are arranged so the cores of the transformers saturate in one direction on their hysteresis loops when the second and the third capacitors are being charged and in the opposite direction when the first capacitor is charged.

15. The device as recited in claim 9 wherein the cores of the transformers are constructed and the capacitors and their associated charging circuits are arranged so the cores of the transformers saturate in one direction on their hysteresis loops when the second capacitor is charged and in the opposite direction when the first capacitor is charged.

16. The device as recited in claim 9 wherein the resettable trip circuit includes a second bistable element that is switched to a tripped state in response to a sensing circuit output for causing the means to interrupt the circuit to the motor and programmable means for causing the capacitor energy to switch the second bistable element to its reset state when the means is programmed so the device operates in an automatic reset mode and prevent the capacitor energy from resetting the second bistable element when the device is programmed to operate in the manual reset mode.

* * * * *

UNITED STATES PATENT OFFICE
CERTIFICATE OF CORRECTION

Patent No. 4,048,663                    Dated September 13, 1977

Inventor(s) Winfred R. Lemke

It is certified that error appears in the above-identified patent and that said Letters Patent are hereby corrected as shown below:

Col. 4, line 24, after "4RES," insert --5RES,--;
Col. 8, line 10, after "voltage" insert --level--;
Col.12, line 58, cancel "then" and insert --than--;
Col.18, line 24, cancel "changed" and insert --charged--;
Col. 18, line 31, cancel "changed" and insert --charged--
Col. 18, line 48, cancel "a" (first occurrence) and insert --an--.

Signed and Sealed this

Twenty-first Day of February 1978

[SEAL]

Attest:

RUTH C. MASON
Attesting Officer

LUTRELLE F. PARKER
Acting Commissioner of Patents and Trademarks